United States Patent
Fang et al.

(10) Patent No.: US 9,909,453 B2
(45) Date of Patent: Mar. 6, 2018

(54) LUBRICATION SYSTEM FOR A TURBINE ENGINE

(71) Applicant: General Electric Company, Schenectary, NY (US)

(72) Inventors: Ning Charles Fang, Mason, OH (US); Donald Albert Bradley, Cincinnati, OH (US); Gert J. van der Merwe, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 458 days.

(21) Appl. No.: 14/715,717

(22) Filed: May 19, 2015

(65) Prior Publication Data
US 2016/0341074 A1    Nov. 24, 2016

(51) Int. Cl.
*F01D 25/20* (2006.01)
*F01D 25/18* (2006.01)
(Continued)

(52) U.S. Cl.
CPC .............. *F01D 25/20* (2013.01); *F01D 25/08* (2013.01); *F01D 25/10* (2013.01); *F01D 25/18* (2013.01); *F01M 1/16* (2013.01); *F01M 5/002* (2013.01); *F02C 7/057* (2013.01); *F02C 7/06* (2013.01); *F02C 7/14* (2013.01); *F16N 27/00* (2013.01); *F01M 2001/123* (2013.01);
(Continued)

(58) Field of Classification Search
CPC .......... F01D 25/20; F01D 25/08; F01D 25/18; F01M 1/16; F01M 5/002; F01M 2001/123; F02C 7/057; F16N 27/00; F16N 2210/02; F05D 2220/32; F05D 2260/213; F05D 2260/98
See application file for complete search history.

(56) References Cited

U.S. PATENT DOCUMENTS 1,329,720 A    2/1920  Meier
1,436,734 A    11/1922 Stoffer
(Continued)

FOREIGN PATENT DOCUMENTS

DE    10 2005 029 075 A1    12/2006
DE    10 2013 207 780 A1    8/2014
(Continued)

OTHER PUBLICATIONS

European Search Report and Opinion issued in connection with corresponding EP Application No. 16170161.0 dated Oct. 24, 2016.
(Continued)

*Primary Examiner* — Richard Edgar
(74) *Attorney, Agent, or Firm* — General Electric Company; Pamela A. Kachur

(57) ABSTRACT

A lubrication system for a gas turbine engine includes a tank, a circulation pump, and a heat exchanger. The circulation pump generates a flow of lubricant from the tank to, e.g., a power gear box of the gas turbine engine and the heat exchanger removes an amount of heat from such flow of lubricant provided to the power gear box. The lubrication system also includes one or more valves in the flow of lubricant for controlling a flowrate and/or temperature of the lubricant provided to, e.g., the power gear box to increase an efficiency and/or durability of the power gear box.

20 Claims, 5 Drawing Sheets

(51) Int. Cl.

| | | |
|---|---|---|
| *F01M 1/16* | (2006.01) | |
| *F01M 5/00* | (2006.01) | |
| *F16N 27/00* | (2006.01) | |
| *F01D 25/08* | (2006.01) | |
| *F02C 7/057* | (2006.01) | |
| *F01D 25/10* | (2006.01) | |
| *F02C 7/06* | (2006.01) | |
| *F02C 7/14* | (2006.01) | |
| *F01M 1/12* | (2006.01) | |

(52) U.S. Cl.
CPC .... *F05D 2220/32* (2013.01); *F05D 2260/213* (2013.01); *F05D 2260/98* (2013.01); *F16N 2210/02* (2013.01)

(56) References Cited

U.S. PATENT DOCUMENTS

| | | |
|---|---|---|
| 2,652,296 A | 9/1953 | Palmgren et al. |
| 2,853,948 A | 9/1958 | Aspelin |
| 3,325,232 A | 6/1967 | Pabst et al. |
| 3,692,372 A | 9/1972 | Pineo |
| 4,177,693 A | 12/1979 | Ivanko et al. |
| 4,235,485 A | 11/1980 | Reiter |
| 4,428,628 A | 1/1984 | Brown |
| 4,479,682 A | 10/1984 | Olivier |
| 4,891,934 A | 1/1990 | Huelster |
| 4,968,158 A | 11/1990 | Atkinson et al. |
| 4,971,457 A | 11/1990 | Carlson |
| 5,119,905 A | 6/1992 | Murray |
| 5,121,599 A | 6/1992 | Snyder et al. |
| 5,121,815 A | 6/1992 | Francois et al. |
| 5,272,868 A | 12/1993 | Ciokajlo et al. |
| 5,441,351 A | 8/1995 | Grunze |
| 6,058,694 A | 5/2000 | Ackerman et al. |
| 6,979,131 B1 | 12/2005 | Lippert et al. |
| 7,293,920 B2 | 11/2007 | Arena |
| 7,490,460 B2 | 2/2009 | Moniz et al. |
| 7,883,438 B2 | 2/2011 | McCune |
| 7,918,649 B2 | 4/2011 | Nakagawa et al. |
| 8,075,438 B2 | 12/2011 | Vetters et al. |
| 8,083,030 B2 | 12/2011 | Portlock |
| 8,256,576 B2 | 9/2012 | Glahn et al. |
| 8,261,527 B1 | 9/2012 | Stearns et al. |
| 8,348,803 B2 | 1/2013 | Matsuoka et al. |
| 8,393,799 B2 | 3/2013 | Dahl |
| 8,398,525 B2 | 3/2013 | Matsuoka et al. |
| 8,517,672 B2 | 8/2013 | McCooey |
| 8,535,009 B2 | 9/2013 | Hofmann |
| 8,740,464 B2 | 6/2014 | Berns |
| 8,747,272 B2 | 6/2014 | Imai et al. |
| 8,777,792 B2 | 7/2014 | Imai et al. |
| 8,869,940 B2 | 10/2014 | Johnson et al. |
| 8,968,148 B2 | 3/2015 | Matsuoka et al. |
| 8,969,148 B2 | 3/2015 | Vinet et al. |
| 8,985,277 B2 | 3/2015 | Hetherington et al. |
| 9,038,779 B2 | 5/2015 | McCune et al. |
| 9,410,448 B2 * | 8/2016 | Sheridan ................ F01D 25/20 |
| 2005/0041901 A1 | 2/2005 | Yakura et al. |
| 2005/0148425 A1 | 7/2005 | Nakagawa et al. |
| 2008/0121376 A1 | 5/2008 | Schwarz et al. |
| 2010/0027932 A1 | 2/2010 | Fujiwara |
| 2010/0107648 A1 | 5/2010 | Bulin et al. |
| 2011/0030385 A1 | 2/2011 | Ellans et al. |
| 2013/0017089 A1 | 1/2013 | Stiesdal |
| 2013/0047624 A1 | 2/2013 | Suciu et al. |
| 2013/0129269 A1 | 5/2013 | Grehn |
| 2013/0192258 A1 | 8/2013 | Kupratis et al. |
| 2013/0269479 A1 | 10/2013 | van der Merwe et al. |
| 2013/0318939 A1 | 12/2013 | Parnin |
| 2014/0075916 A1 | 3/2014 | Augros |
| 2014/0109589 A1 | 4/2014 | Pritchard, Jr. et al. |
| 2014/0161591 A1 | 6/2014 | Venter |
| 2014/0241851 A1 | 8/2014 | Demitraszek et al. |
| 2014/0256494 A1 | 9/2014 | Lewis et al. |
| 2015/0030273 A1 | 1/2015 | Sebald et al. |
| 2015/0377343 A1 | 12/2015 | Fugel et al. |

FOREIGN PATENT DOCUMENTS

| | | |
|---|---|---|
| EP | 1389671 A2 | 2/2004 |
| EP | 1 574 731 A2 | 9/2005 |
| EP | 2 538 055 A2 | 12/2012 |
| EP | 2 559 913 A1 | 2/2013 |
| FR | 2970504 A1 | 7/2012 |
| GB | 1 550 789 A | 8/1979 |
| JP | H01110825 A | 4/1989 |
| JP | H04-318230 A | 11/1992 |
| JP | 2007-263357 A | 10/2007 |
| JP | 2010-525234 A | 7/2010 |
| WO | 2012049322 A1 | 4/2012 |
| WO | 2012/069274 A1 | 5/2012 |
| WO | 2014/123857 A1 | 8/2014 |
| WO | 2014123863 | 8/2014 |
| WO | 2014152347 | 9/2014 |
| WO | 2015/026899 A1 | 2/2015 |
| WO | 2015/055291 A1 | 4/2015 |

OTHER PUBLICATIONS

Search Report and Opinion issued in connection with related IT Application No. 102015000078920 dated Aug. 24, 2016.
Extended European Search Report and Opinion issued in connection with related EP Application No. 16190098.0 dated Feb. 7, 2017.
Extended European Search Report and Opinion issued in connection with related EP Application No. 16193771.9 dated Mar. 23, 2017.
Extended European Search Report and Opinion issued in connection with related EP Application No. 16190097.2 dated Mar. 23, 2017.
Extended European Search Report and Opinion issued in connection with related EP Application No. 16200478.2 dated Apr. 5, 2017.
Japanese Search Report issued in connection with corresponding JP Application No. 2016-095708 dated Apr. 21, 2017.
Notification of Reasons for Refusal issued in connection with corresponding JP Application No. 2016-095708 dated May 9, 2017.
First Office Action and Search issued in connection with corresponding CN Application No. 201610333609.X dated Jun. 20, 2017.
Decision to Grant issued in connection with corresponding JP Application No. 2016-095708 dated Jul. 4, 2017.
Office Action issued in connection with related CA Application No. 2942693 dated Jul. 26, 2017.
Hasting et al., U.S. Appl. No. 14/886,372, filed Oct. 19, 2015.
Tompkins et al., U.S. Appl. No. 15/364,294, filed Nov. 30, 2016.
Hasting et al., U.S. Appl. No. 14/865,265, filed Sep. 25, 2015.
Hasting et al., U.S. Appl. No. 14/865,239, filed Sep. 25, 2015.

* cited by examiner

LUBRICATION SYSTEM FOR A TURBINE ENGINE

FIELD OF THE INVENTION

The present subject matter relates generally to a gas turbine engine having a fan, or more particularly to a lubrication system for a gas turbine engine having a fan.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the combustion section drives the combustion section and is then routed through the exhaust section, e.g., to atmosphere. In particular configurations, the turbine section is mechanically coupled to the compressor section by one or more shafts extending along an axial direction of the gas turbine engine.

The fan includes a plurality of blades having a radius larger than the core of the gas turbine engine. The fan and the plurality of blades are typically driven by one of the shafts. However, for efficiency reasons, it can be beneficial to have the plurality of blades of the fan rotate at a speed less than a speed at which the respective shaft is rotating. Accordingly, a power gear box is provided in certain gas turbine engines to mechanically couple the fan to the respective shaft in such a manner that allows the fan to rotate at a slower and more efficient speed.

The gas turbine engine additionally includes a lubrication system for providing lubricant to one or more portions of the gas turbine engine, such as the compressor and turbine sections of the core and the power gear box. Typical lubrication systems have a set ratio of lubricant provided at a common temperature to each of the serviced portions. However, the inventors in the present disclosure have found that under certain conditions, it may be beneficial to increase or decrease an amount of lubricant provided to the power gear box or other serviced portions to increase an efficiency of the power gear box or such other serviced portions. The inventors of the present disclosure have also found that under certain conditions it may be beneficial to increase or decrease a temperature of the lubricant provided to the power gear box or other serviced portions to further increase an efficiency of the power gear box or such other serviced portions.

Accordingly, a gas turbine engine capable of controlling certain characteristics of the lubricant provided to the power gear box or other serviced portions, such as flow rate and temperature, would be particularly useful.

BRIEF DESCRIPTION OF THE INVENTION

Aspects and advantages of the invention will be set forth in part in the following description, or may be obvious from the description, or may be learned through practice of the invention.

In the exemplary embodiment of the present disclosure, a lubrication system for a gas turbine engine is provided. The lubrication system includes a tank configured to store a volume of lubricant and a circulation pump for generating a flow of lubricant from the tank to a component of the gas turbine engine. The lubrication system also includes a valve in fluid communication with the flow of lubricant generated by the circulation pump and defining a flow inlet and a flow outlet. The valve also defines a variable throughput between the flow inlet and the flow outlet for controlling a flowrate of lubricant to the component of the gas turbine engine. The lubrication system also includes a heat exchanger positioned in thermal communication with the flow of lubricant generated by the circulation pump at a location downstream of the valve for controlling a temperature of the lubricant prior to the lubricant reaching the component.

In another exemplary embodiment of the present disclosure, a lubrication system for a gas turbine engine is provided. The lubrication system includes a tank configured to store a volume of lubricant and a first circulation pump for generating a first flow of lubricant from the tank to one or more first components of the gas turbine engine. The lubrication system also includes a second circulation pump for generating a second flow of lubricant from the tank to one or more second components of the gas turbine engine. The second flow of lubricant is separate from the first flow of lubricant and the one or more second components are different than the one or more first components. The lubrication system also includes a valve defining an inlet and an outlet each in flow communication with the second flow of lubricant. The valve defines a variable throughput between the inlet and the outlet for controlling a flowrate of the second flow of lubricant to the one or more second components.

In yet another exemplary embodiment of the present disclosure, a gas turbine engine is provided. The gas turbine engine includes a turbine section mechanically coupled to a compressor section through a shaft, a fan driven by the shaft through a power gear box, and a lubrication system. The lubrication system includes a tank, a circulation pump for generating a flow of lubricant from the tank to the power gear box, and a valve. The valve is in fluid communication with the flow of lubricant generated by the circulation pump and defines an inlet and an outlet. The valve also defines a variable throughput between the inlet and the outlet for controlling a flowrate of lubricant to the power gear box of the gas turbine engine. The lubrication system also includes a heat exchanger positioned in thermal communication with the flow of lubricant generated by the circulation pump at a location downstream of the valve for controlling a temperature of the flow of lubricant prior to the lubricant reaching the power gear box.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
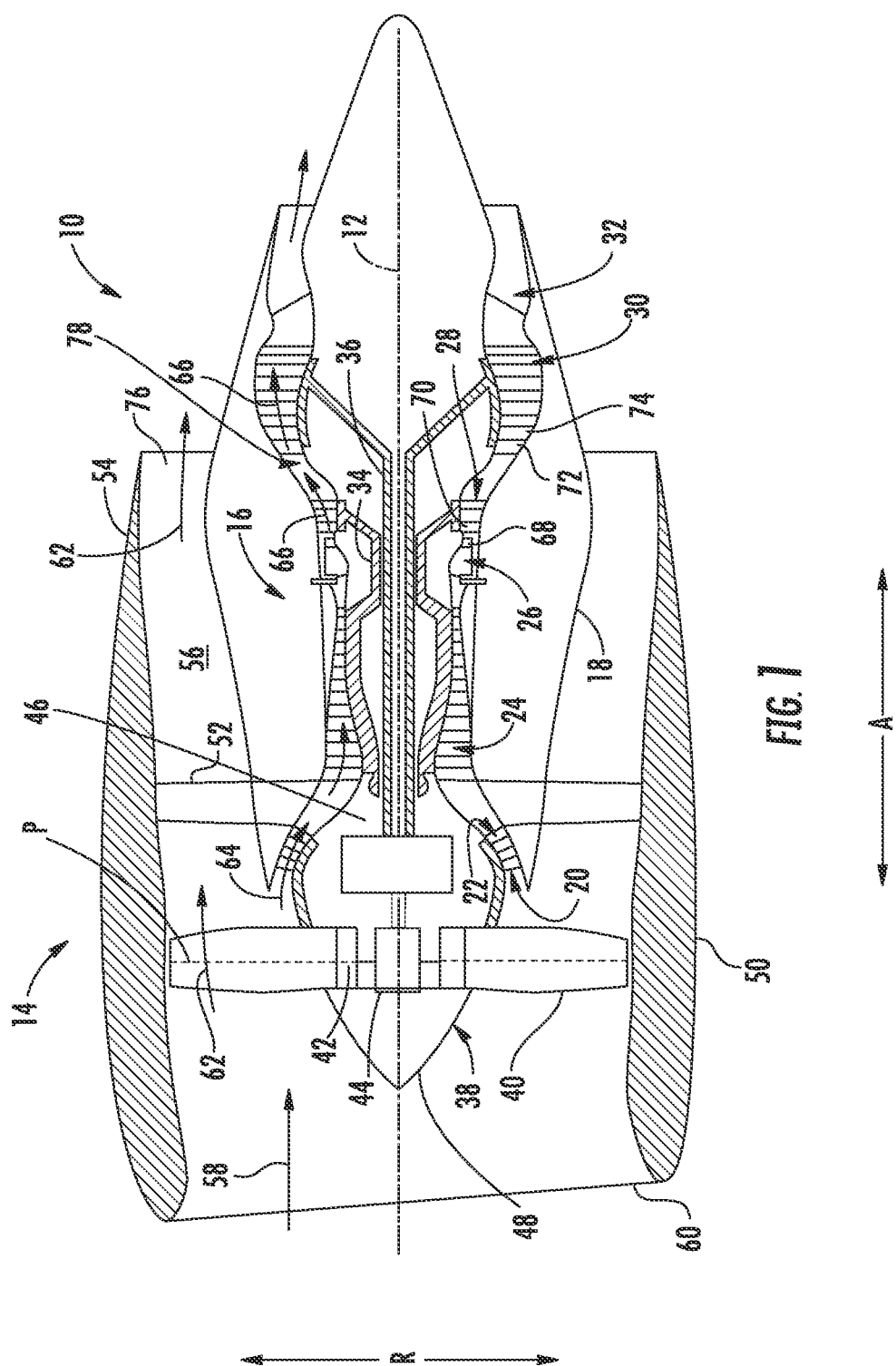
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed. It should be appreciated, however, that in other exemplary embodiments, the fan 38 may not be a variable pitch fan and instead may be a fixed fan. For example, in other exemplary embodiments, the fan blades 40 may not be configured to rotate about respective pitch axes P, and the fan section 14 may not include an actuation member 44.

As will be discussed in greater detail below, the exemplary turbofan engine 10 further includes a lubrication system 100 (FIG. 2) configured to provide a lubricant to one or more of the compressor section (including the LP compressor 22 and HP compressor 24), the turbine section (including the HP turbine 28 and the LP turbine 30), the HP spool 34, the LP spool 36, the power gear box 46, the actuation member 44, and/or the disk 42. The lubricant may increase the useful life of such components and/or may remove a certain amount of heat from such components.

Referring still to the exemplary embodiment of FIG. 1, the disk 42 is covered by rotatable front spinner 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated by those of ordinary skill in the art that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10 also providing propulsive thrust. The HP turbine 28, the LP turbine 30, and the jet exhaust nozzle section 32 at least partially define a hot gas path 78 for routing the combustion gases 66 through the core turbine engine 16.

Although not depicted, the operation of the turbofan engine 10 may be monitored by several sensors, such as pressure and/or temperature sensors, detecting various conditions of, e.g., the compressor section, the turbine section, combustion section 26, and/or the ambient environment. Additionally, a controller 80 (depicted in phantom in FIG. 2) may be included to control certain aspects of the turbofan engine 10. The controller 80 may generally be any turbine engine control system known in the art that permits a turbine engine to be controlled and/or operated as described herein. Generally, the controller 80 may include any computer system having one or more processor(s) and associated memory device(s) configured to perform a variety of computer-implemented functions to control the turbofan engine 10. For example, the controller 80 may include a full-authority digital electronic control (FADEC) control system used in control of certain aircraft engines.

It should be appreciated, that as used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. The memory devices may include software or other control instructions that, when executed by the processor, performs desired functions.

Figure 2:
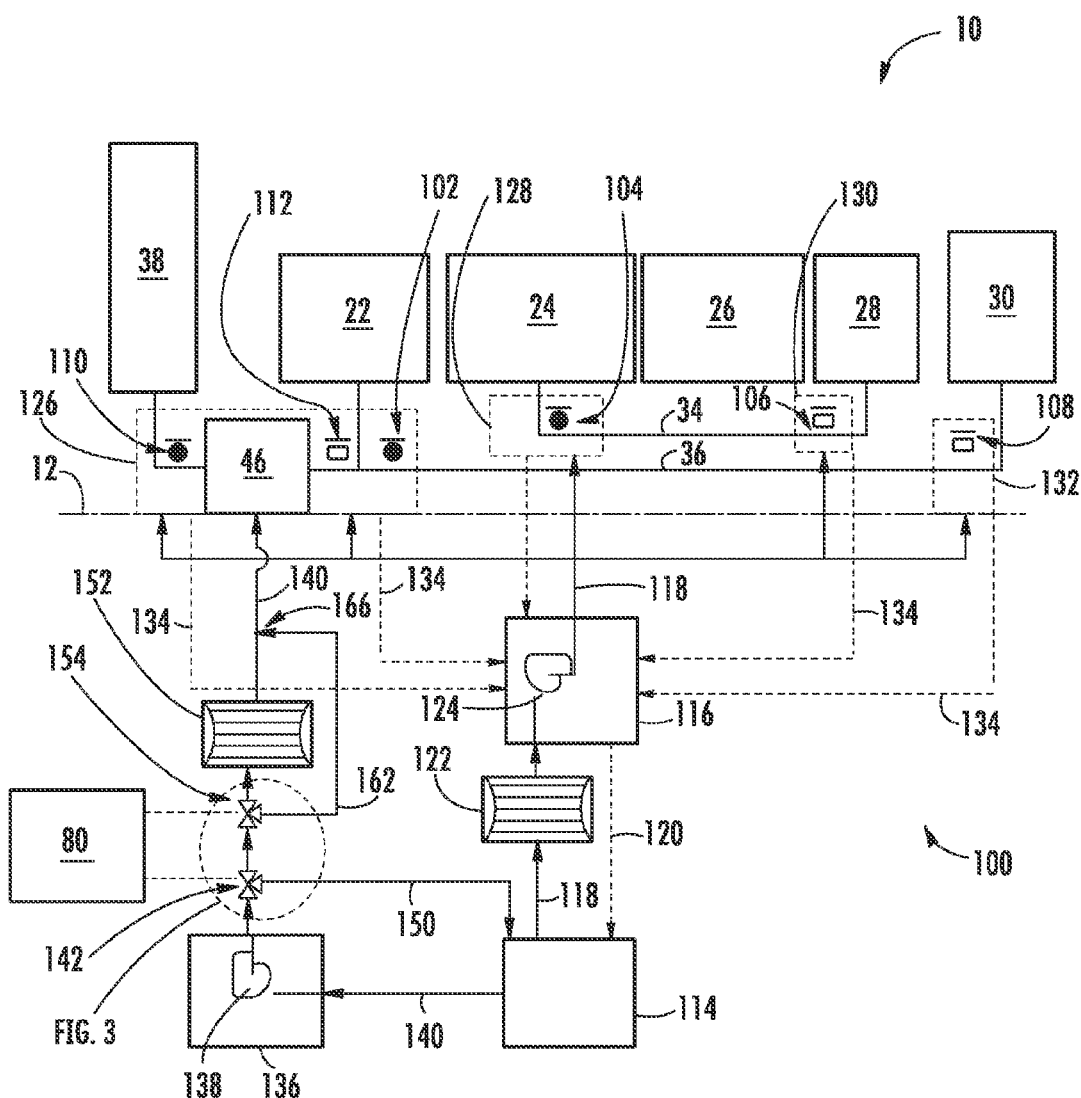
FIG. 2 is a schematic view of the exemplary gas turbine engine of FIG. 1, including a lubrication system in accordance with an exemplary embodiment of the present disclosure.

Referring now to FIG. 2, a schematic view of the exemplary turbofan engine 10 of FIG. 1 is provided, including a lubrication system 100 in accordance with an exemplary embodiment of the present disclosure. As shown in FIG. 2 and as discussed above, the exemplary turbofan engine 10 includes a compressor section including an LP compressor 22 and an HP compressor 24, a combustion section 26, and a turbine section including an HP turbine 28 and an LP turbine 30. The HP compressor 24 and HP turbine 28 are mechanically coupled by an HP shaft 34 and the LP compressor 22 is mechanically coupled to the LP turbine 30 by an LP shaft 36. Moreover, a fan 38 is rotatable by the LP shaft 36 across a power gear box 46.

As is also depicted schematically, certain of these components include one or more bearings to locate and/or position such components as well as to facilitate the rotation of such components about the axial centerline 12. For example, the LP compressor 22 includes a plurality of LP compressor bearings 102, the HP compressor 24 includes a plurality of HP compressor bearings 104, the HP turbine 28 includes a plurality of HP turbine bearings 106, the LP turbine 30 includes a plurality of LP turbine bearings 108, and the fan 38 includes a plurality of fan bearings 110. Additionally, for the embodiment depicted, the exemplary turbofan engine 10 includes a plurality of shaft bearings 112. It should be appreciated, however, that in other exemplary embodiments the turbofan engine 10 may include any suitable placement and or configuration of bearings to locate and/or position the components as well as to facilitate rotation of the components of the turbofan engine 10.

The exemplary lubrication system 100 depicted is configured to provide a lubricant to one or more components of the turbofan engine 10, including the respective bearings of such components. As used herein, the term "lubricant" refers to any substance suitable for reducing the amount of friction between surfaces in mutual contact and for carrying away generated heat. For example, in certain exemplary embodiments, lubricant may refer to an oil-based lubricant.

The exemplary lubrication system 100 of FIG. 2 generally includes a tank 114 configured to store a volume of lubricant and a first lubrication unit 116, or main lubrication unit. The first lubrication unit 116 is fluidly connected to the tank 114 through a first supply line 118, or main supply line, and a return line 120. Positioned in thermal communication with the first supply line 118—and any lubricant flowing therethrough—is a first heat exchanger 122 or main heat exchanger. The first heat exchanger 122 for the embodiment depicted is positioned upstream from the first lubrication unit 116 and is configured to remove an amount of heat from the lubricant in the first supply line 118 prior to such lubricant reaching the first lubrication unit 116. In other exemplary embodiments, however, the first heat exchanger 122 may alternatively be positioned in thermal communication with the return line 120. Such a configuration may generally be referred to as a "cold tank configuration."

Additionally, the first lubrication unit 116 includes a first circulation pump 124, or main circulation pump, for generating a first flow of lubricant from the tank 114 to one or more portions of the turbofan engine 10 through the first supply line 118. The first circulation pump 124 may be mechanically coupled to the LP shaft 36 or HP shaft 34 and driven by the LP shaft 36 or HP shaft 34, such that a rotational speed of the first circulation pump 124 corresponds to a rotational speed of the respective shaft 36, 34. For example, in the embodiment depicted, the first circulation pump 124 is configured to generate a first flow of lubricant at a common temperature from the tank 114, over or through the first heat exchanger 122, and to the fan 38, the LP compressor 22, the HP compressor 24, the HP turbine 28, and the LP turbine 30. More particularly, the first circulation pump 124 is configured to provide a pressurized flow of lubricant (i.e., the first flow of lubricant) at a common temperature through the first supply line 118 directly to the plurality of fan bearings 110, the plurality of shaft bearings 112, the plurality of LP compressor bearings 102, the plurality of HP compressor bearings 104, the plurality of HP turbine bearings 106, and the plurality of LP turbine bearings 108. It's be appreciated, that as used herein, the term "line" refers broadly to any type of fluid line or conduit capable of carrying a flow of lubricant. Moreover, line may refer to a plurality of fluid lines or conduits capable of carrying a flow of lubricant. For example, as is shown in FIG. 2, the first supply line 118 includes a plurality of sub-supply lines extending to the various components of the turbofan engine 10.

Further, as is depicted in phantom for clarity, the turbofan engine 10 includes one or more sumps for collecting lubricant provided to the bearings discussed above, as well as other components (e.g., seals, gears, etc.). More particularly, for the embodiment depicted, the turbofan engine 10 includes an engine sump 126 for collecting lubricant provided to the fan bearings 110, shaft bearings 112, and/or LP compressor bearings 102; an HP compressor sump 128 for collecting lubricant provided to the HP compressor bearings 104; an HP turbine sump 130 for collecting lubricant provided to the HP turbine bearings 106; and an LP turbine sump 132 for collecting lubricant provided to the LP turbine bearings 108. Each of the sumps are fluidly connected to the first lubrication unit 116 through a plurality of suction lines 134 (also drawn in phantom for clarity). The first lubrication unit 116 may include one or more suction or scavenger pumps (not shown) to provide a negative pressure in such section lines 134 to draw the lubricant from the respective sumps, through the first lubrication unit 116, and back to the tank 114 through the return line 120. It should be appreciated, however, that in other embodiments of the present disclosure, the turbofan engine 10 may have any other suitable number or configuration of sumps. For example, other exemplary turbofan engines may have additional sumps not discussed herein.

Referring still to exemplary embodiment of FIG. 2, the exemplary lubrication system 100 depicted further includes a second lubrication unit 136, or a dedicated lubrication unit. The second lubrication unit 136 similarly includes a second circulation pump 138, or dedicated circulation pump, for generating a second flow of lubricant through a second supply line 140 from the tank 114. More particularly, the second circulation pump 138 generates a second pressure of lubricant through the second supply line 140 from the tank 114. It should be appreciated, however, that in other exemplary embodiments, the lubrication system 100 may not include the second lubrication unit 136, and the second circulation pump 138 may instead be positioned in the first lubrication unit 116.

However, as is discussed below, for the embodiment depicted the second flow of lubricant and second supply line 140 are separate from the first flow of lubricant and the first supply line 118, and may be at a different temperature and pressure than the first flow of lubricant and first supply line 118. Further, the second flow of lubricant generated by the second circulation pump 138 is provided through the second supply line 140 primarily to the power gear box 46 of the turbofan engine 10—or for the embodiment depicted, solely to the power gear box 46. As is discussed in the description that follows, such a configuration allows for control of certain parameters of the lubricant provided to the power gear box 46 to, e.g., increase an efficiency of the power gear box 46 and the turbofan engine 10.

It should be appreciated, however, that in other exemplary embodiments, the second flow of lubricant generated by the second circulation pump 128 may additionally be provided to other components of the turbofan engine 10. For example, in other exemplary embodiments, the second flow of lubricant generated by the second circulation pump 128 may additionally be provided to, e.g., the HP turbine sump 130, the LP turbine sump 132, or a combustor sump, each of which may benefit from a flow of lubricant having a decreased flowrate and/or temperature. Alternatively, in still other exemplary embodiments, the second flow of lubricant generated by the second circulation pump 128 may be provided solely to one or more of such other components of the turbofan engine 10.

The second circulation pump 138 may also be mechanically coupled to the LP shaft 36 or HP shaft 34 and driven by the LP shaft 36 or HP shaft 34 such that a rotational speed of the second circulation pump 138 corresponds to a rotational speed of the respective shaft 36, 34. Therefore, without additional control mechanisms in place, an amount of lubricant provided to the power gear box 46 by the second circulation pump 138 would be fixed to a rotational speed of the LP shaft 36 or HP shaft 34. Accordingly, for the embodiment depicted, the exemplary lubrication system 100 includes a flow rate control valve 142 in fluid communication with the second flow of lubricant and the second supply line 140 generated by the second circulation pump 138. The flow rate control valve 142 is positioned downstream from the second circulation pump 138 in the second flow of lubricant generated by the second circulation pump 138.

Figure 3:
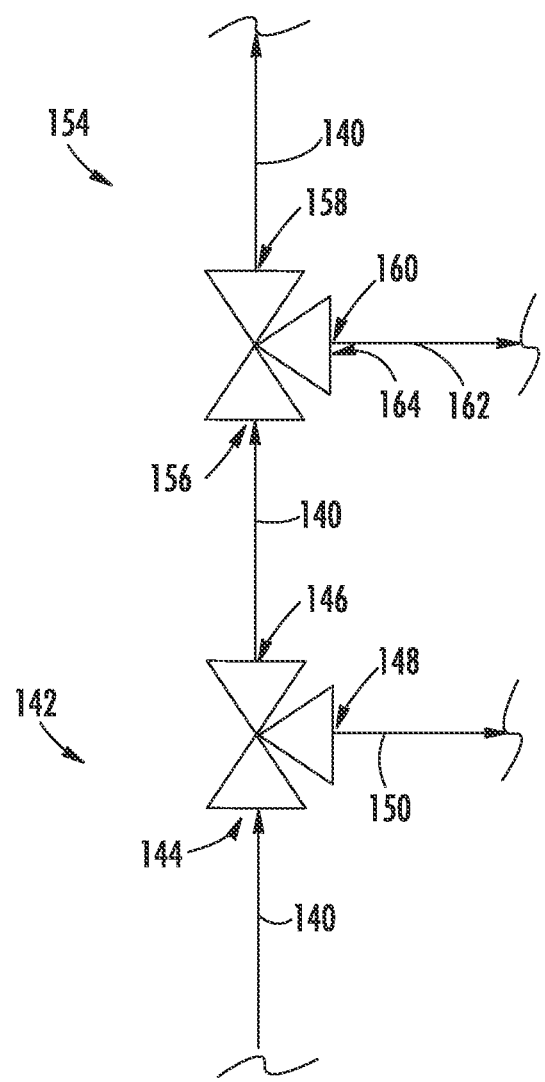
FIG. 3 is a close-up schematic view of a portion of the exemplary lubrication system of FIG. 2.

Referring now also to the close-up view of the flow rate control valve 142 provided in FIG. 3, for the embodiment depicted, the flow rate control valve 142 is configured as a three-way valve defining a flow inlet 144, a first outlet 146, and a return outlet 148. The flow rate control valve 142 defines a variable throughput between the flow inlet 144 and the first outlet 146 for controlling an amount lubricant provided to the power gear box 46 by the second circulation pump 138 (i.e., a flow rate of lubricant provided to the power gear box 46). For example, the flow rate control valve 142 may be movable between a fully open position, wherein substantially all of the second flow of lubricant provided to the flow inlet 144 is subsequently provided to the first outlet 146, and a partially open position, wherein at least a portion of the second flow of lubricant provided to the flow inlet 144 is instead provided to the return outlet 148. In certain exemplary embodiments for example, in certain exemplary embodiments up to about thirty percent (30%), up to about forty percent (40%), or up to about fifty percent (50%) of the lubricant provided to the inlet 144 may be provided to the return outlet 148 when the flow rate control valve 142 is in the partially open position. It should be appreciated, that as used herein, terms of approximation such as "about" or "approximately" refer to being within a ten percent (10%) margin of error.

Additionally, for the embodiment depicted, the lubrication system 100 includes a return line 150, with the return outlet 148 fluidly connected to the return line 150. The return line 150 extends from the return outlet 148 directly to the tank 114 for returning a portion of the second flow of lubricant to the tank 114. The return line 150 alternately may extend from the return outlet 148 to an engine accessory gearbox (AGB) or another engine sump 126, 128, etc. for scavenging back through main lube unit 116 and back to the tank 114.

Referring still to FIGS. 2 and 3, the exemplary lubrication system 100 additionally includes a second heat exchanger 152 and a bypass valve 154 positioned upstream from the second heat exchanger 152. The second heat exchanger 152 and second bypass valve 154 are positioned in thermal communication with the second flow of lubricant in the second supply line 140 for removing heat from such second flow of lubricant. For the embodiment depicted, the second heat exchanger 152 is positioned in thermal communication with the second flow of lubricant at a location downstream of the second circulation pump 138 and the flow rate control valve 142. However, in other exemplary embodiments, the second heat exchanger 152 may instead be positioned upstream from one or both of the second circulation pump 138 and the flow rate control valve 142.

Moreover, for the embodiment of FIGS. 2 and 3, the bypass valve 154 is a three-way bypass valve 154 defining an inlet 156, a first outlet 158, and a bypass outlet 160. The bypass valve 154 defines a variable throughput between the inlet 156 and the first outlet 158. For example, the bypass valve 154 may be movable between a fully open position, wherein substantially all of the second flow of lubricant provided to the inlet 156 is subsequently provided to the first outlet 158, and a partially open position, wherein at least a portion of the second flow of lubricant provided to the inlet 156 is instead provided to the bypass outlet 160. In certain exemplary embodiments for example, up to about thirty percent (30%), up to about forty percent (40%), or up to about fifty percent (50%) of the lubricant provided to the inlet 156 may be provided to the bypass outlet 160 when the bypass valve 154 is in the partially open position.

Accordingly, for the embodiment depicted the lubrication system 100 additionally includes a bypass line 162, with the bypass outlet 160 fluidly connected to the bypass line 162 at a first end 164 of the bypass line 162. Additionally, the bypass line 162 extends from the bypass outlet 160 at the first end 164 to the second flow of lubricant at a location downstream from the second heat exchanger 152 at a second and opposite end 166.

The flow rate control valve 142 and the bypass valve 154 may each be in operable communication with the controller 80 of the turbofan engine 10. Accordingly, the controller 80 may control an amount of lubricant provided to the power gear box 46 (including a pressure and flow rate of lubricant provided to the power gear box 46) and a temperature of such lubricant provided to the power gear box 46.

In certain situations it may be beneficial to provide the power gear box 46 with a relatively large amount of lubricant at a relatively cool temperature. For example, when the turbofan engine 10 is operating under conditions requiring a high amount of thrust in relatively hot ambient conditions, it may be desirable to provide the power gear box 46 with a high flow rate of lubricant a cool temperature. In such a situation, the flow rate control valve 142 may be in the fully open position such that substantially all lubricant provided to the inlet 144 is subsequently provided to the first outlet 146. Additionally, in such a situation, the bypass valve 154 may also be in the fully open position such that substantially all lubricant provided to the inlet 156 is subsequently provided to the first outlet 158.

However, in other situations may be beneficial to provide the power gear box 46 with a relatively small amount of lubricant at a relatively high temperature. For example, when the turbofan engine 10 is operating under cruise conditions in relatively cool ambient conditions, may be desirable to provide the power gear box 46 with a low flow rate of lubricant at a high temperature. Notably, providing the lubricant at a relatively high temperature may decrease a viscosity of the lubricant, thus allowing for a more efficient operation of the power gear box 46. In such a situation, the flow rate control valve 142 may be in a partially open position, such that at least a portion of the lubricant provided to the inlet 144 is subsequently provided to the return outlet 148 and returned to the tank 114 via the return line 150. Additionally, in such a situation, the bypass valve 154 may also be in a partially open position, such that at least a portion of the lubricant provided to the inlet 156 is subsequently provided to the bypass outlet 158. Notably, in such a situation a temperature of the lubricant provided to the power gear box 46 may still be controlled to ensure that it does not exceed a safe operating temperature of the components within the power gear box 46.

Of course, the flow rate control valve 142 and the bypass valve 154 may alternatively be operated independently from one another. Accordingly, in still other situations, a relatively low amount of lubricant at a relatively low temperature may be provided to the power gear box 46, or alternatively relatively high amount of lubricant at a relatively high temperature may be provided to the power gear box 46.

The flow rate control valve 142 and bypass valve 154 may include any suitable three port valve. For example, in certain exemplary embodiments one or both of the flow rate control valve 142 and bypass valve 154 may include a three-way ball valve. Additionally, or alternatively, one or both of the flow rate control valve 142 and bypass valve 154 may include any other suitable structure capable of providing a variable throughput between inlets 146, 156 and first outlets 148, 158, respectively.

Alternatively, it should be appreciated, that in other exemplary embodiments, the exemplary lubrication system 100 may have any other suitable configuration for controlling a flow rate of lubricant to the power gear box 46 and/or a temperature of lubricant provided to the power gear box 46.

Figure 4:
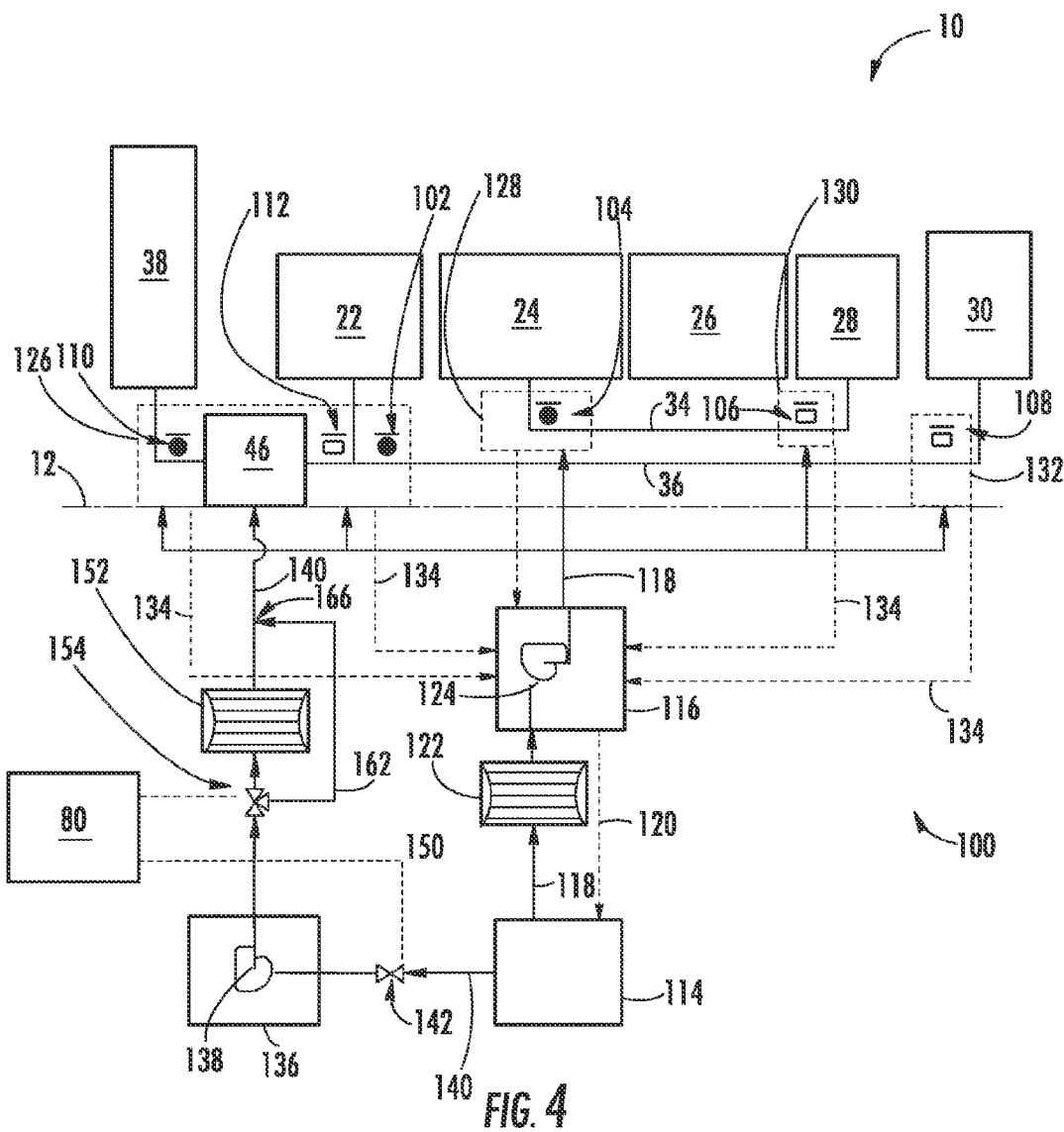
FIG. 4 is a schematic view of the exemplary gas turbine engine of FIG. 1, including a lubrication system in accordance with another exemplary embodiment of the present disclosure.

For example, referring now to FIG. 4 an exemplary lubrication system 100 is provided in accordance with another exemplary embodiment of the present disclosure. The exemplary lubrication system 100 depicted in FIG. 4 may be configured in substantially the same manner as the exemplary lubrication system 100 depicted in FIG. 2 and described above. However, for the exemplary embodiment of FIG. 4, the flow rate control valve 142 is instead positioned in the second flow of lubricant generated by the second circulation pump 138 at a location upstream from the second lubrication unit 136 and the second circulation pump 138. With such a configuration, the flow rate control valve 142 may not be a three-way valve and the exemplary lubrication system 100 may not include a separate return line 150 fluidly connecting to the flow rate control valve 142 and the tank 114. Instead, the flow rate control valve 142 may be any suitable valve defining a variable throughput between an inlet and an outlet.

Figure 5:
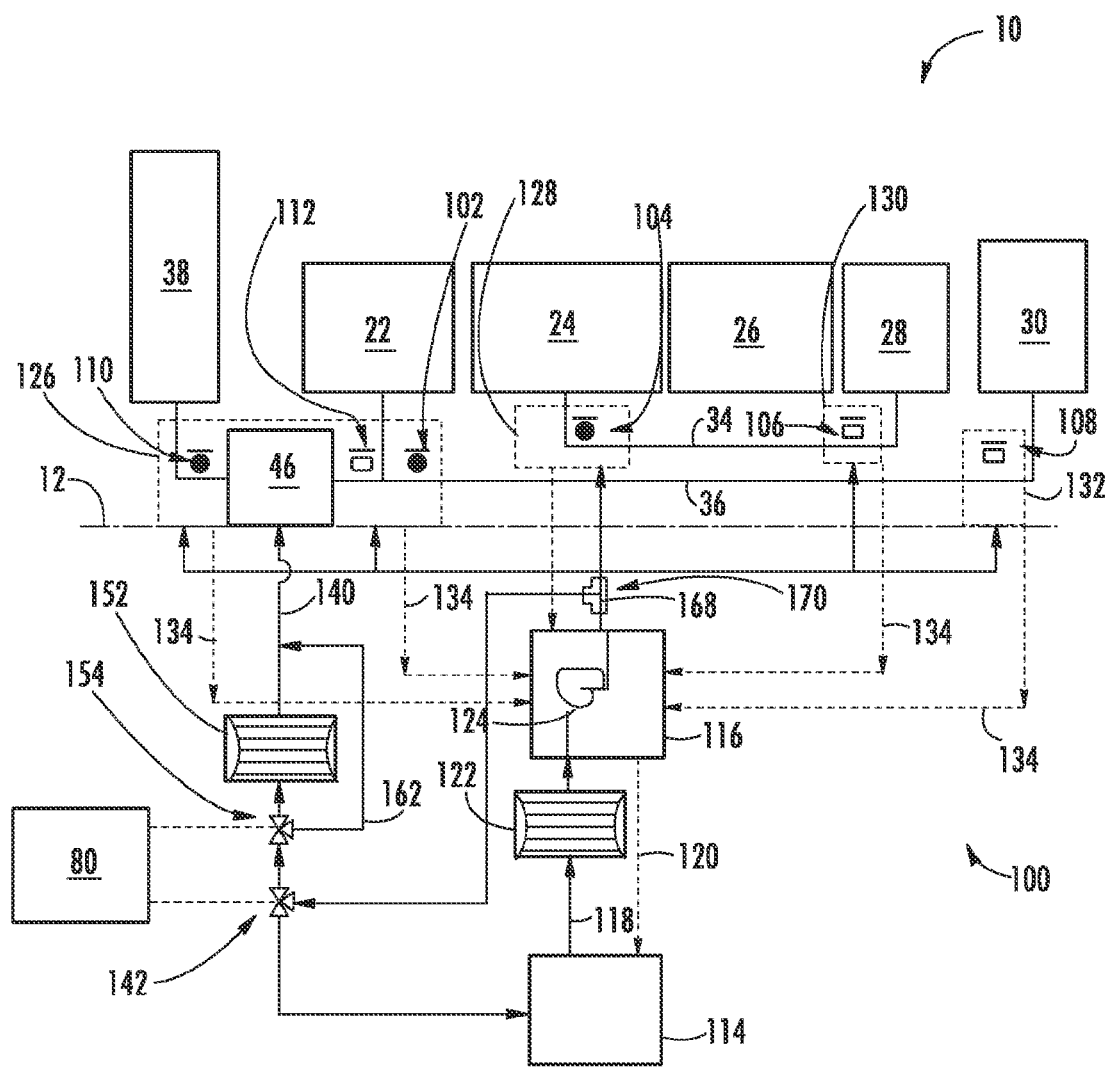
FIG. 5 is a schematic view of the exemplary gas turbine engine of FIG. 1, including a lubrication system in accordance with yet another exemplary embodiment of the present disclosure.

Alternatively still, referring now to FIG. 5, an exemplary lubrication system 100 is provided in accordance with yet another exemplary embodiment of the present disclosure. As is depicted, for the exemplary embodiment of FIG. 5, the exemplary lubrication system 100 does not include a second lubrication unit 136 or a second circulation pump 138. Instead, the first flow of lubricant generated by the first circulation pump 124 (of the first lubrication unit 116) is split downstream of the first circulation pump 124 at a junction 170 to provide a dedicated flow of lubricant to the power gear box 46. At the junction 170, the first flow of lubricant in the first supply line 118 is split between the first flow of lubricant and a second flow of lubricant (provided to the power gear box 46 through a second supply line 140).

As is depicted, the second flow of lubricant and the second supply line 140 is configured to provide lubricant directly to the power gear box 46 of the turbofan engine 10. With such an exemplary embodiment, the flow rate control valve 142 and the bypass valve 154 are positioned in and in fluid communication with the second flow of lubricant, downstream from the juncture 170.

However, still other exemplary embodiments may include any other suitable configuration. For example, referring still to FIG. 5, in other exemplary embodiments, the flow rate control valve 142 may instead be positioned at the juncture 170 where the first flow of lubricant is split off between the remaining first flow of lubricant and the second flow lubricant. With such an exemplary embodiment, the flow rate control valve 142 may define an inlet in flow communication with the first supply line 118, a first outlet also in flow communication with the first supply line 118, and a second outlet in flow communication with the second supply line 140. Such a flow rate control valve 140 may define a variable throughput between the inlet and the second outlet to control an amount of lubricant provided to the power gear box 46.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A lubrication system for a gas turbine engine comprising:
    a tank configured to store a volume of lubricant;
    a circulation pump for generating a flow of lubricant from the tank to a component of the gas turbine engine;
    a valve in fluid communication with the flow of lubricant generated by the circulation pump and defining a flow inlet and a flow outlet, the valve also defining a variable throughput between the flow inlet and the flow outlet for controlling a flowrate of lubricant to the component of the gas turbine engine; and
    a heat exchanger positioned in thermal communication with the flow of lubricant generated by the circulation pump at a location downstream of the valve for controlling a temperature of the lubricant prior to the lubricant reaching the component.

2. The lubrication system of claim 1, wherein the valve is positioned downstream from circulation pump in the flow of lubricant generated by the circulation pump.

3. The lubrication system of claim 1, wherein the circulation pump generates a flow of lubricant from the tank to a power gear box of the gas turbine engine.

4. The lubrication system of claim 1, wherein the circulation pump is driven by a shaft of the gas turbine engine.

5. The lubrication system of claim 1, further comprising:
    a heat exchange bypass valve in fluid communication with the flow of lubricant generated by the circulation pump and defining an inlet, a first outlet, and a second outlet, wherein the second outlet is in fluid communication with a bypass line, and wherein the bypass line extends between the second outlet and the flow of lubricant generated by the circulation pump at a location downstream from the heat exchanger.

6. The lubrication system of claim 1, wherein the circulation pump is a dedicated circulation pump for the component, and wherein the lubrication system further comprises
    a main circulation pump for generating a flow of lubricant from the tank to one or more of a compressor section of the gas turbine engine and a turbine section of the gas turbine engine.

7. The lubrication system of claim 6, further comprising:
    a main heat exchanger positioned in thermal communication with the flow of lubricant generated by the main circulation pump at a location upstream of the main circulation pump.

8. The lubrication system of claim 1, wherein the valve is in operable communication with a controller of the gas turbine engine.

9. The lubrication system of claim 1, wherein the flow of lubricant generated by the circulation pump is split downstream of the circulation pump between a first flow path and a second flow path, wherein the second flow path is configured to provide the flow of lubricant to the component of the gas turbine engine, and wherein the valve is in fluid communication with the second flow path.

10. The lubrication system of claim 9, wherein the circulation pump is further configured to generate a flow of lubricant from the tank through the first flow path to one or more of a compressor section of the gas turbine engine and a turbine section of the gas turbine engine.

11. A lubrication system for a gas turbine engine comprising:
    a tank configured to store a volume of lubricant;
    a first circulation pump for generating a first flow of lubricant from the tank to one or more first components of the gas turbine engine;
    a second circulation pump for generating a second flow of lubricant from the tank to one or more second components of the gas turbine engine, the second flow of lubricant being separate from the first flow of lubricant and the one or more second components being different than the one or more first components; and
    a valve defining an inlet and an outlet each in flow communication with the second flow of lubricant, the valve defining a variable throughput between the inlet and the outlet for controlling a flowrate of the second flow of lubricant to the one or more second components.

12. The lubrication system of claim 11, wherein the second circulation pump is configured to generate the second flow of lubricant from the tank to a power gear box of the gas turbine engine.

13. The lubrication system of claim 11, wherein the valve is positioned downstream from the second circulation pump in the second flow of lubricant generated by the second circulation pump.

14. The lubrication system of claim 13, wherein the valve further defines a return outlet in fluid communication with a return line, and wherein the return line extends from the return outlet of the valve to the tank for returning a portion of the second flow of lubricant to the tank.

15. The lubrication system of claim 11, further comprising:
    a heat exchanger in thermal communication with the second flow of lubricant for removing heat from the second flow of lubricant.

16. The lubrication system of claim 15, further comprising:
    a heat exchanger bypass valve in fluid communication with the second flow of lubricant defining an inlet, a first outlet, and a second outlet, wherein the second outlet is in fluid communication with a bypass line, and wherein the bypass line extends between the bypass outlet and the second flow of lubricant at a location downstream from the heat exchanger.

17. The lubrication system of claim 15, wherein the heat exchanger is in thermal communication with the second flow of lubricant at a location downstream from the second circulation pump.

18. The lubrication system of claim 11, wherein the first circulation pump and the second circulation pump are each driven by a shaft of the gas turbine engine.

19. A gas turbine engine comprising:
    a turbine section mechanically coupled to a compressor section through a shaft;
    a fan driven by the shaft through a power gear box; and
    a lubrication system comprising a tank;

a circulation pump for generating a flow of lubricant from the tank to the power gear box;

a valve in fluid communication with the flow of lubricant generated by the circulation pump and defining an inlet and an outlet, the valve defining a variable throughput between the inlet and the outlet for controlling a flowrate of lubricant to the power gear box of the gas turbine engine; and a heat exchanger positioned in thermal communication with the flow of lubricant generated by the circulation pump at a location downstream of the valve for controlling a temperature of the flow of lubricant prior to the lubricant reaching the power gear box.

20. The gas turbine engine of claim 19, wherein the circulation pump is a dedicated circulation pump for the power gear box, and wherein the lubrication system further comprises a main circulation pump for generating a flow of lubricant from the tank to one or more of the compressor section of the gas turbine engine and the turbine section of the gas turbine engine.

\* \* \* \* \*

UNITED STATES PATENT AND TRADEMARK OFFICE
CERTIFICATE OF CORRECTION

PATENT NO. : 9,909,453 B2
APPLICATION NO. : 14/715717
DATED : March 6, 2018
INVENTOR(S) : Ning Fang, Donald Albert Bradley and Gert J. van der Merwe It is certified that error appears in the above-identified patent and that said Letters Patent is hereby corrected as shown below:

On the Title Page

In (72) in Line 1, The name of inventor "Ning Charles Fang" is hereby corrected to "Ning Fang".

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*